May 26, 1970 J. P. PORTER 3,513,693
ELASTOMER SHEAR TESTING APPARATUS
Filed Nov. 12, 1968 3 Sheets-Sheet 1
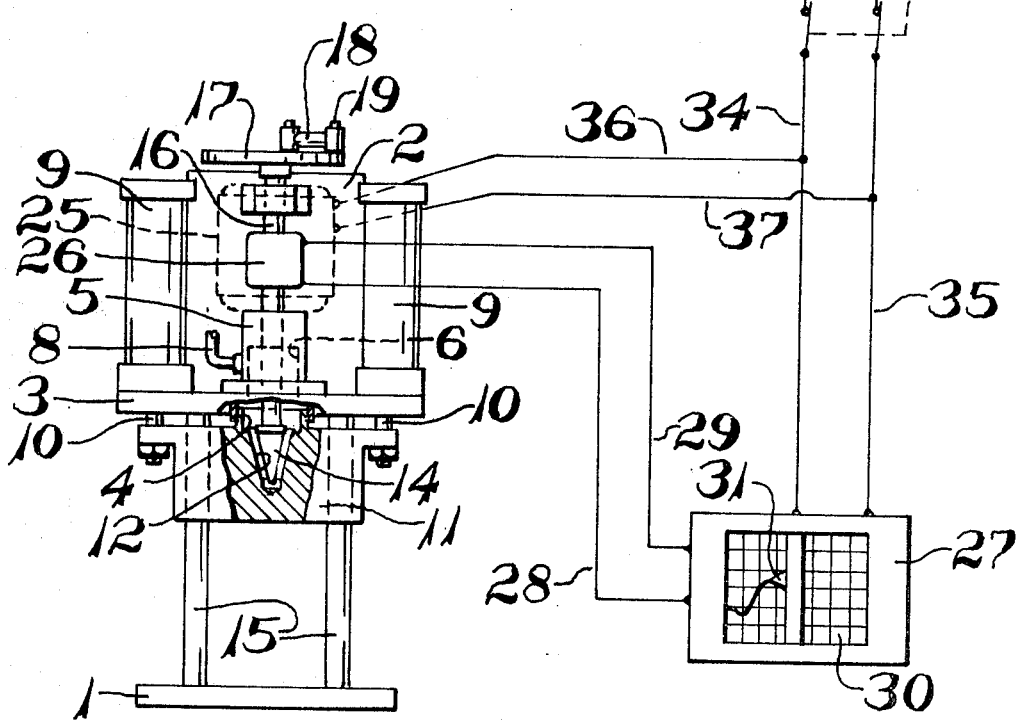
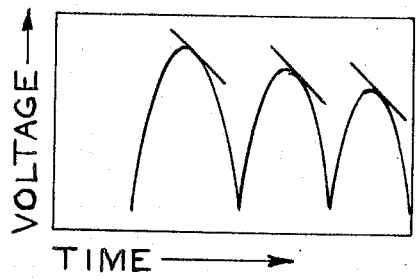
Fig. 6
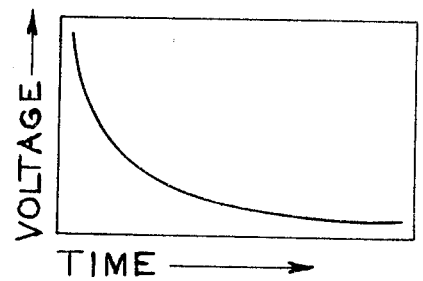
Fig. 7
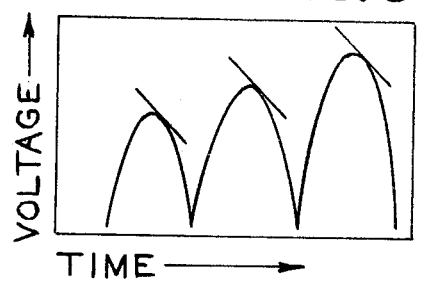
Fig. 9
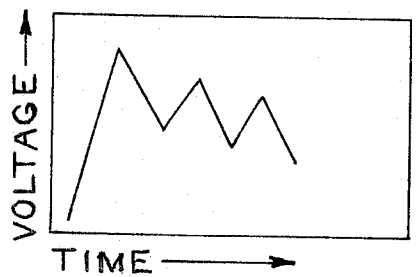
Fig. 8
INVENTOR.
JOHN P. PORTER
BY Joseph Januszkiewicz
ATTY.

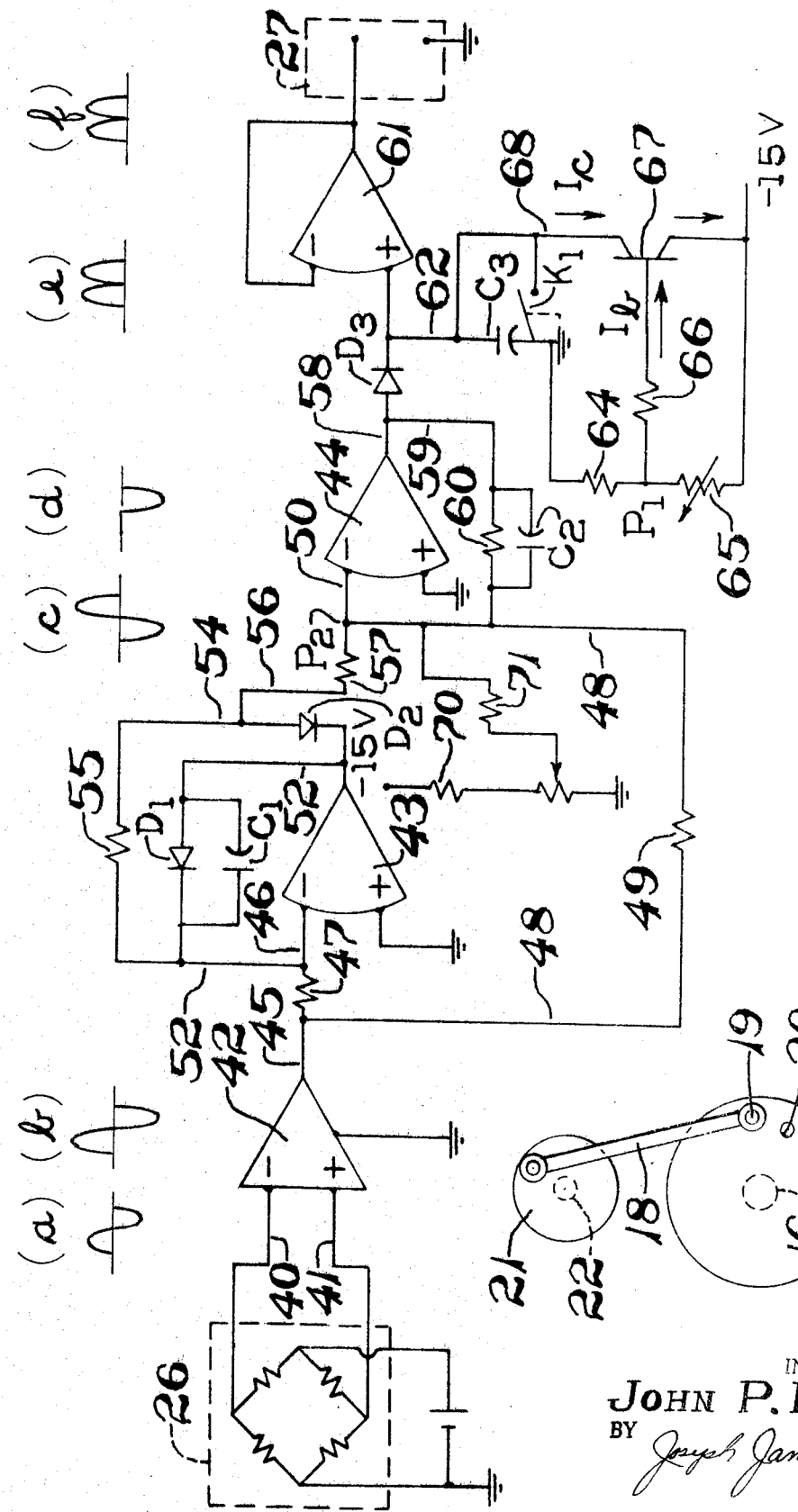

INVENTOR.
JOHN P. PORTER

United States Patent Office 3,513,693
Patented May 26, 1970

3,513,693
ELASTOMER SHEAR TESTING APPARATUS
John P. Porter, Cuyahoga, Falls, Ohio, assignor to The B. F. Goodrich Company, New York, N.Y., a corporation of New York
Filed Nov. 12, 1968, Ser. No. 774,958
Int. Cl. G01n 3/32
U.S. Cl. 73—91                                10 Claims

ABSTRACT OF THE DISCLOSURE

An elastomeric testing apparatus which subjects a sample of elastomer to oscillating shearing forces providing an output signal that is cyclically varying and generally sinusoidal whose curve pattern has reverse slopes wherein a control circuit includes an amplifier and full wave rectifier means connected to a memory circuit and a recorder in cooperation with a controllable linear discharge means thereby providing a trace which is the envelope of the peaks values of the output signal. Means are provided to control the slope of the linear discharge means to provide means for accurately tracing varying the output signal.

BACKGROUND OF THE INVENTION

This invention relates to a means which provides an output signal which accurately depicts the peak value of a rapidly fluctuating response from a torque cell and more particularly to a test instrument which exerts oscillating shearing forces on a confined test sample whose output is recorded as a single line curve which has reverse slopes.

In the testing of elastomeric materials by cyclic forces, the test apparatus having an electrical transducer actuated by response of the material to the forces provides a cyclically varying, essentially sinusoidal output signal. In order to compare the variations that occur in sample speimens that have slightly different variables, such as compounding formula, temperatures, or pressures, it is necessary to accurately study the shape of the recordings of the test results. This is difficult to do when the recording reproduces each of the cyclic signals from the test apparatus whereas it is only the envelope of the peaks of those signals which is of interest. Although circuits have been known that attempt to plot only the peak values of sinusoidal waves, such known circuits have not been satisfactory for an apparatus testing the viscosity or cure rate of elastomers since the cyclic varying electrical signals from such tests have an envelope which includes both varying amplitude and reverse slopes which are not accurately reproduced by prior peak value recording devices.

SUMMARY OF THE INVENTION

The present invention provides a control circuit which accurately traces a single, continuous, smooth curve which is the envelope of the peak of each response of a torque cell that has a cyclic, generally sinusoidal output the amplitude of which varies such that the said curve has reverse slopes.

BRIEF DESCRIPTION OF THE DRAWINGS

FIG. 1 is a schematic front-elevational view of the apparatus, partly in section, illustrating the relationship of the various control elements and a recorder with a chart disclosing an elastomer cure curve of torque versus times;

FIG. 2 is a plan view of the connection between the drive wheels for oscillating the test plate;

FIG. 5 illustrates the control circuit for controlling the output of the torque cell to the recorder;

FIG. 6 is a portion of an output signal of descending values illustrating via a linear line the slope of a discharge signal;

FIG. 7 illustrates a typical decay of a transient component as a function of time;

FIG. 8 is a typical output of a descending sine wave such as illustrated in FIG. 6 wherein the peaks of the sine wave are recorded; and FIG. 9 illustrates a portion of an output signal of ascending value with a linear line illustrating the slopes of the discharge signal.

Referring to the drawings, wherein like reference characters designate like or corresponding parts throughout the several views, there is shown in FIG. 1 a base plate 1 having attached to its rearward end portion an upwardly extending back plate 2. Back plate 2 has an intermediately located horizontally extending elongated bracket 3 with a bore 4 located in the central portion thereof to receive a cylindrical member 5, which member 5 has a cylindrical recess 6 at the lower end portion thereof and provides a chamber to be described. Cylindrical member 5 has a passageway extending therethrough communicating cylindrical recess 6 with a conduit 8 which is adapted to be connected to a pressure source, not shown. Mounted on bracket 3 are a pair of spaced cylinders 9 which have pistons therein with piston rods 10 extending through bores in such bracket for connection to a carrier member 11. Carrier member 11 has a conical-shaped recess 12 at its central portion adapted to receive a cone-shaped rotor 14 for a purpose to be described. Carrier member 11 is guided in its reciprocal upward and downward movement by at least a pair of spaced guide rods 15 which are secured to the base plate 1 and bracket 3 respectively. Back plate 2 suitably journals for rotation a shaft 16 which is connected to a wheel member 17 for rotation therewith. As shown in FIG. 2, one end of a crank member 18 is mounted for connection to wheel member 17 as by a pin 19. Wheel 17 (FIG. 2) has a plurality of pin-receiving index holes 20, each at a different radial spacing from the vertical axis of wheel 17. An eccentric drive wheel 21 is mounted on an output shaft 22 of a variable speed motor 25. The other end portion of crank 18 is pivotably mounted to such eccentric drive wheel 21 to transfer the rotational movement of shaft 22 to an oscillating motion in wheel 17 and shaft 16. The amplitude of oscillation of wheel 17 is dependent on the particular mounting of the pin 19 in index hole 20, while the frequency of oscillation is dependent upon the output speed of motor 25. Suitable transmission means may be connected between the output shaft 22 and the variable speed motor 25 to provide a range of output speeds; however, for simplicity of illustration motor 25 is shown as directly connected to the output shaft 22.

Figure 3:
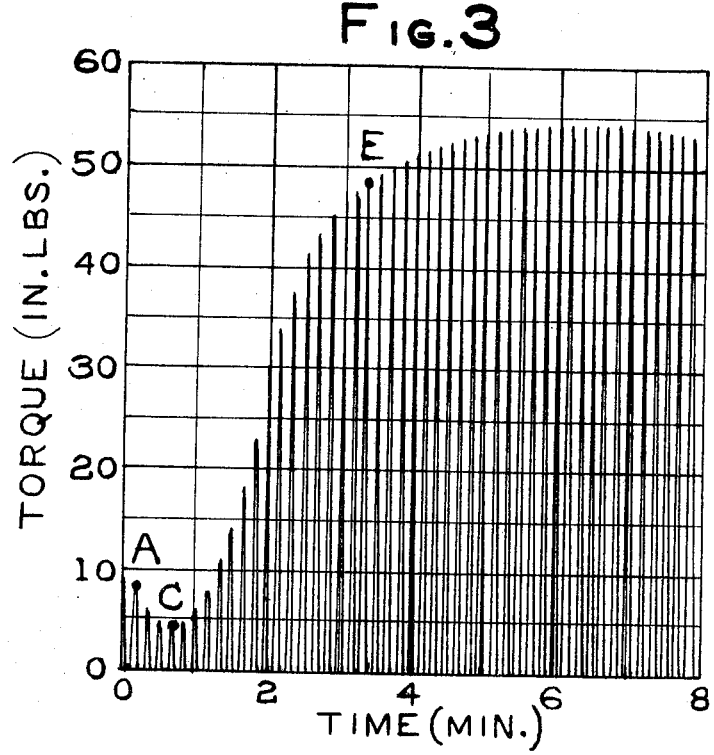
FIG. 3 is a chart illustrating the positive portion of the output of the torque cell.

Shaft 16 extends downwardly for connection to the cone rotor 14 to provide oscillation thereto. Mounted on shaft 16 is a torque cell or torque-sensing pickup device 26 which responds to torque forces in shaft 16 to actuate a torque recorder 27 through electrical lines 28 and 29. Such recorder 27 has a pen 31 which graphically draws on the chart 30 the torque values as a function of time. Such pickup device 26 may comprise a bonded resistance wire strain gauge well known in the art, and therefore neither illustrated nor described in detail, wherein such wire gauges are bonded to the shaft 16 in such a position and are so connected into a birdge circuit that they cancel the effects of bending and thrust strain while adding the effects of torsional strain with the relation between the bridge unbalance and torsional strain being linear. Such pickup devices are manufactured by the Baldwin-Lima-Hamilton Company located in Waltham, Mass. The electrical power for the apparatus is supplied by the electrical lines 32 and 33 which are connected to a source of electrical power not shown. A double-pole, single-throw switch connects lines 32 and 33 to main control lines 34 and 35 which lead to the torque pickup recorder 27. Motor 25 receives its power supply from the lines 34 and 35 via branch lines 36 and 37. Suitable branch lines not shown are provided to supply current to a suitable temperature control unit, well known in the art, which in turn regulates the heating coils for the cone 14 and the carrier member 11 to maintain a predetermined temperature on the sample located between the core cavity in such carrier member 11 and the cone rotor 14.

FIG. 5 schematically discloses the torque cell 26 which provides an output signal that is directly proportional to the torque developed in the shaft 16 which oscillates the rotor 14. The output signal, the upper half of which is depicted in FIG. 3, is cyclically varying, essentially sinusoidal, since it is a function of the displacement of oscillating rotor 14. The amplitude of such output signal is a function of the torque resistance of the sample of elastomeric material tested as the latter goes from uncured to cured condition. Such output signal, for purposes of simplification and explanation will be depicted as a simple sine wave in FIG. 5. This output signal from the torque cell 26 passes via lines 40 and 41 to an instrumentation amplifier 42. The output from amplifier 42 is connected to a full wave rectifier circuit which includes amplifiers 43 and 44 and diodes $D_1$ and $D_2$. It will be seen that amplifier 43 is connected to amplifier 42 via lines 45, 46 and a resistor 47. A line 48 with resistor 49 therein interconnects line 45 with a line 50 which is connected to the input of amplifier 44. The output of amplifier 43 is connected to lines 52 and 53 with line 52 being connected to the input of amplifier 43 via a capacitor $C_1$ and diode $D_1$. Line 53 has a diode $D_2$ and a branch line 54 with resistor 55 thereon connected to line 46 and a branch line 56 connected with resistor 57 which is connected with line 50 and amplifier 44. The junction of branch line 56 and line 48 is a summing junction as will be explained. The output of amplifier 44 is connected via line 58 to a diode $D_3$. Branch line 59 interconnects resistor 60 and capacitor $C_2$, with line 48.

Diode $D_3$ on line 58 and capacitor $C_3$ on line 62 provide a memory circuit for the output signal from amplifier 44. The positive signal from amplifier 44 is stored in capacitor $C_3$ with amplifier 61 being of a voltage follower type which provides a low impedance output to the recorder 27.

A linear slope control circuit is connected to capacitor $C_3$ and includes a voltage divider resistor 64, a potentiometer 65, and a current resistor 66 along with a transistor 67 used as a common emitter. Transistor 67 has its base connected to resistor 66, its collector connected via line 68 to line 62 which interconnects the capacitor $C_3$ to diode $D_3$. With potentiometer 65 connected to a potential source of −15 volts and resistor 64 connected to ground (FIG. 5), there is provided at point $P_1$ a constant voltage which in turn provides a constant current $I_b$ to the base of transistor 67, which in turn causes a constant collector current $I_c$ to flow from capacitor $C_3$ through transistor 67 which provides a controllable and substantially linear discharge of capacitor $C_3$ to thereby provide to amplifier 61 an input which corresponds to the instantaneous peaks of the signals from torque cell 26. The slope of the time constant of the memory circuit can be adjusted through potentiometer 65 which provides an accurate means for obtaining the peak values, both maximum and minimum, and the required slopes for the curve enveloping the instantaneous peaks of the torque cell signals. As an example of the linear slope control means, resistor 64 can be assigned a value of 500 kilohms, potentiometer 65, 50 kilohms and current limit resistor a value of 10 megohms. Recorder 27 is connected to amplifier 61 to record the output shown in FIG. 4 and the chart 30 (in FIG. 1) and which is the envelope of the peaks of the signals shown in FIG. 3. Other resistors in the illustration may have values such as 10K for resistor 47, 20K for resistor 49, 10K for resistor 55, 10K for resistor 57, 10K for resistor 70, 10K for resistor 71, and 20K for resistor 60.

The torque cell 26 generates a sinusoidal (as simplified for purposes of explanation) output signal, wherein such signal is directly proportional to the torque developed by the shaft 16. The amplitude of such signal is a function of the torque of curing the sample of material. The output signal from the torque cell 26 passes via lines 40 and 41 as a sine wave form, depicted in FIG. 5 as (a) above line 40, to amplifier 42 which amplifies and inverts such signal to the form shown as (b) above line 45. The output signal from amplifier 42 has two paths. The signal traveling via line 48 appears at line 50 as a sine wave (c) depicted above line 50. The other path of the output signal from amplifier 42 is through amplifier 43 and via diode $D_2$ which passes only the negative portion of the wave to provide a wave form depicted as (d). Line 52 and diode $D_1$ cooperate with the amplifier 43 to provide a zero output of the amplifier for the positive portion of the input signal. The gain in amplitude of the portion of the signal going through amplifier 43 is twice the amplitude of the signal going through line 48 so that, as shown in FIG. 5, the amplitude for signal (d) is twice that of (c). Summation of the voltages of signals (c) and (d) is effected at point $P_2$ and this input to amplifier 44, which provides a gain of minus 1 and inverts, produces an output signal with full rectification as depicted by wave (e). This positive going signal (f) passes via line 58 into the peak follower circuit wherein diode $D_3$, and capacitor $C_3$ cooperates with the linear discharge circuit to provide a memory circuit for the instantaneous input peaks which are fed to the recorder 27 after amplification by amplifier 61.

The slope control circuit, via potentiometer 65, adjusts the slope of the discharge time constant of condenser $C_3$.

Figure 4:
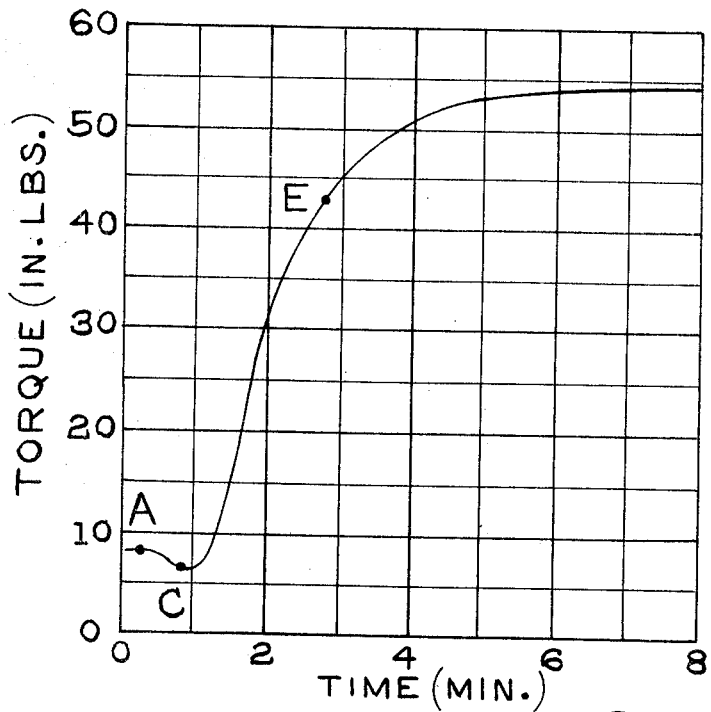
FIG. 4 is a chart illustrating the output of the torque cell as modified by the control circuit.

When the test sample is initially subjected to the oscillation, it is stiff and accordingly provides a resistance to the oscillation; however, as the sample is worked and heated, its resistance decreases whereby the slope is of the negative type as depicted from point A to point C on the curves of FIGS. 3 and 4. Ordinarily the transient decay from a condenser of an instantaneous signal is not linear but rather one dipicted by FIG. 7 and when one attempts to provide an envelope of such signals on a progressively decreasing curve as depicted from point A to point C in FIG. 3, the trace would be a saw-tooth type depicted by FIG. 8. With the linear slope control described, the decay of the instantaneous voltages are converted to signals which permits their tracing as an envelope depicted from points A to C on FIG. 4. The point of minimum viscosity is point C on FIG. 4, after which the sample's resistance increases as the sample is further subjected to oscillation due to curing taking place in the sample. The curve now becomes positive or slopes upwardly as from point C to point E. The difficulty here is that the general direction of the slope of the curve is reversed and as depicted by FIG. 9, the slope of the individual sine wave signals as they decrease from their maximum positive amplitude, is in a direction opposite to the direction of advance of the envelope. This would produce a saw-tooth curve of differently shaped teeth from that of FIG. 8. However, through the linear slope control means described above the linear discharge of the memory circuit is so selected as to essentially smooth out both saw-tooth configurations thus providing an essentially smooth envelope for the output signal both in the positive and negative directions. Upon completion of a test run wherein a test sample is cured, the head end of hydraulic cylinder 9 is pressurized to move carrier member 11 downwardly to separate the conical-shaped recess 12 from the cone-shaped rotor 14 which actuates switch K₁ to short capacitor C₃ and returns the memory circuit to its original condition to test another sample.

I claim:

1. In an apparatus for subjecting a sample of elastomer to reversible forces and recording the changes of resistance of the elastomer to such forces, the said apparatus including a rotor, means to oscillate said rotor in contact with the elastomer and means to provide a cyclically varying generally sinusoidal electrical signal representative of the torque exerted in said elastomer, the improvement which comprises: means to amplify and full wave rectify said signal, condenser means to temporarily store the rectified signal, means to provide a controllable and substantially linear discharge of said condenser means, and recorder means connected to said condenser means to thereby provide a trace which is substantially the envelope of the instantaneous peaks of the said cyclically varying signal.

2. In an apparatus as set forth in claim 1 wherein said means to provide a controllable and linear discharge to said condenser means includes a transistor having a base, collector and emitter, said collector being connected to one side of said condenser, and said base connected to a constant current source.

3. In an apparatus as set forth in claim 2 wherein a potentiometer is operatively connected to said current source to provide means for selectively controlling the value of the constant current to said base to control said discharge rate from said condenser.

4. A control circuit as set forth in claim 1 wherein said memory circuit contains a linear slope control means for controlling the slope of said memory circuit and operates to provide said final signal.

5. A control circuit as set forth in claim 4 wherein a recorder is connected to said memory circuit for monitoring the output therefrom to visually display as a curve said final signal.

6. A control circuit as set forth in claim 5 wherein said memory circuit includes a capacitor and a capacitor discharge control means which controls the slope of the discharge of said final signal received by said capacitor.

7. A control circuit as set forth in claim 6 wherein said capacitor discharge control means includes a transistor having a base, collector and emitter, said collector being connected to the one side of said capacitor, and said base connected to a constant current source.

8. A control circuit as set forth in claim 7 wherein said constant current source has a potentiometer connected thereto to provide means for selecting the value of the constant current to said base of said transistor to thereby control said discharge rate from said capacitor.

9. A test apparatus comprising a housing having a cavity for confining a sample of elastomeric material under pressure and heat, rotor means for subjecting said sample of material to an oscillating shearing force, torque sensing means connected to said rotor means for providing an output, amplifier means and rectifier means operatively connected to torque sensing means to receive, rectify and amplify said output to an output signal, a memory circuit operative to receive said output signal and temporarily store said output signal, circuit means connected to said memory circuit to provide a linear discharge therefrom, and recorder means connected to said memory circuit to provide a trace which is the envelope of the instantaneous peaks of said output from said torque sensing means.

10. A control circuit for providing an output signal to a recorder comprising a torque cell operative to provide a high frequency output, a first amplifier operatively connected to said torque cell to receive said output and amplify said high frequency output to an output signal, a second amplifier operative to receive said output signal to pass and amplify only the negative portion of said output signal at double the amplitude to a summation junction point, circuit means operative to receive said output signal to provide a signal to said junction point that is equal to said amplifier output signal of said first amplifier, and a memory circuit operative to receive the signals from said junction point to provide a final linear signal which contains the peaks only of said high frequency output.

References Cited

UNITED STATES PATENTS

| | | | |
|---|---|---|---|
| 3,088,064 | 4/1963 | Anger | 320—1 |
| 3,182,494 | 5/1965 | Beatty et al. | 73—101 |

JERRY W. MYRACLE, Primary Examiner

U.S. Cl. X.R.

73—101